M. S. ROOT.
Grain Drill.
No. 28,411.
Patented May 22, 1860.
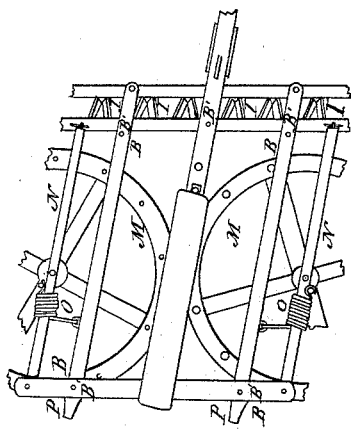
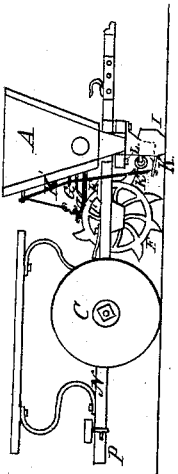
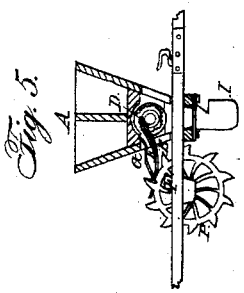
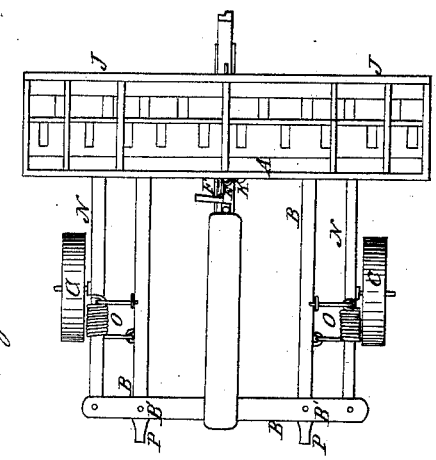
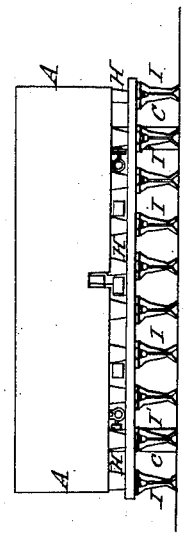
Witnesses:
H. Bronson
Wm. H. Aldus
Inventor:
Marshall S. Root

UNITED STATES PATENT OFFICE.

MARSHALL S. ROOT, OF MEDINA, OHIO.

IMPROVEMENT IN SEEDING-HARROWS.

Specification forming part of Letters Patent No. 28,411, dated May 22, 1860.

*To all whom it may concern:*

Be it known that I, M. S. ROOT, of Medina, in the county of Medina and State of Ohio, have invented certain new and useful Improvements in a Combined Harrow and Seeding-Machine; and I do hereby declare the following to be a full and complete description thereof, reference being had to the accompanying drawings, forming a part of this specification, in which—

Figure 1 is a plan view of the seed-drill. Fig. 2 combines a rotating harrow and cultivator; Fig. 3, a side view of the seed-drill and corn-planter; Fig. 4, a front view of the drill and corn-planter; Fig. 5, a detached section of the seeding apparatus, showing the ratchet-wheel and pawl by which the roller in the seed box or hopper is worked.

Like letters refer to like parts in the different views.

A, Fig. 1, is a view of seed box or hopper with a chambered roller at the bottom; B B, an adjustable jointed frame, secured at the joints of intersection B' B' B' B' by the means of pins or bolts, which frame is also mounted upon the two wheels C C.

Fig. 5 is a side view of Fig. 1, showing the manner by which the roller in the seed box or hopper A is turned.

D is a ratchet-wheel placed at the middle of the roller. The lever E, connected with the ratchet-wheel D, is acted upon by the cam-wheel F, which is secured to the center bar of the jointed frame B B. As the drill moves forward the cam F strikes the ground, and as it turns the cam-points throw up the lever E. The finger E', which connects with the lever into the ratchet-wheel D, turns the roller, as seen in Fig. 5. The lever is then immediately thrown back upon the cam by a small spring, G, secured to the side of the seed-box A, a dog or pawl being placed under the ratchet-wheel D to prevent return action. Under the seed box or hopper A are tubes H, connected with the hopper at the under side and leading to the spouts I I I I, through which the seed or grain is conveyed to the ground.

In using this machine for planting corn the corn is placed in the apartments J J of the seed-box A, the spouts I' I' being only used for this purpose. To prevent the corn from passing to the ground continually, a small spring-valve, K, is fixed in and at the foot of the spouts I' I', to which is connected a strong cord, K', running upward and along the side of the seed box or hopper A to the lever E, to which it is fastened, the cam-wheel, as before mentioned, operating the lever E, at the same time opens the valve K by means of the cord K', when it is again closed by a coil-spring, L, as shown in Fig. 3. The number of grains and the distance of hills may be regulated by the number of cam-points on the cam-wheel.

Fig. 2 represents the machine as a combined rotating harrow and cultivator, the wheels C C, Fig. 1, being removed, and the armed wheels M M are placed upon the same axle. In the rim of these wheels drag-teeth are inserted. The outside bars, N N, are so connected with the frame as to turn, around which the coil-springs O O are secured, Figs. 1, 2. The object of these springs is to cause the outer side of the harrow-wheels M M to work deeper in the ground than the opposite side, giving by this means a revolving motion to the harrows.

The angular character of the jointed frame B B, as shown in Fig. 2, is for the purpose of throwing one of the wheels M M a little in advance of the other, so as to leave no space of ground undisturbed wider than any passed over by the harrows. This angularity of the frame may be made greater or less, as the case may require.

The spouts I I I I, as shown in Figs. 2, 4, are used as cultivator-teeth in this machine, performing both duties, as the occasion may demand. The spouts or teeth may all be removed, together with the seed-box, the frame A A and the wheels M M, Figs. 1, 2, forming an independent double rotating harrow.

The advantages gained by this machine are the improvement in the construction of the frame B B, so that the harrow-wheels may be made to follow each other in as direct a line as the operator may desire; also, the handles P P, as shown in Figs. 1, 2, at the back end of the machine, by the aid of which the wheels, one at a time, may be lifted over any obstruction; also, the frame-work, when mounted upon the wheels C C, being then in the form of a cart, is equal to a wagon-bed; also, the coil or spiral springs O O wound around the bars, so that the harrows thereby are made to rotate, the springs being cheaper and lighter than a weighted roller or a loaded arm.

My arrangement is an improvement of the seed-box, and the partitions in it for separating the small seed from the large, renders it much more convenient than two separate seed-boxes and the apparatus for operating the seed-roller or seeder, one roller here answering the purpose of two by having two sets of cells, one for small seed, the other for large; also, another advantage over other seed sowers or drills is having the ratchet and pawl attached to the middle of the seed-roller and operated by a spur-wheel behind the seed-box. The wheel being behind the box it is near the center of the machine, so that in turning round it does not drag into the ground so much as it would do otherwise. Another advantage in my machine is that it is seed-sower, corn-planter, harrow, and grain-drill combined, constituting one machine. A certain quantity of plaster can be planted in each hill of corn, if desired, by placing the plaster behind the seed-box.

What I claim as my improvement, and desire to secure by Letters Patent, is—

The special arrangement of adjustable jointed frame B, harrows, Fig. 2, seeding-machine, Figs. 3 and 5, when combined and operating in the manner and for the purposes hereinbefore described.

MARSHALL S. ROOT.

Witnesses:
  H. BRONSON,
  WM. H. ALDEN.